US011290165B2

(12) United States Patent
Tanio et al.

(10) Patent No.: US 11,290,165 B2
(45) Date of Patent: Mar. 29, 2022

(54) TRANSMITTER AND METHOD OF CONTROLLING TRANSMITTER

(71) Applicant: NEC Corporation, Tokyo (JP)

(72) Inventors: Masaaki Tanio, Tokyo (JP); Shinichi Hori, Tokyo (JP); Tomoyuki Yamase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 425 days.

(21) Appl. No.: 16/336,514

(22) PCT Filed: Sep. 20, 2017

(86) PCT No.: PCT/JP2017/033818
§ 371 (c)(1),
(2) Date: Mar. 26, 2019

(87) PCT Pub. No.: WO2018/061899
PCT Pub. Date: Apr. 5, 2018

(65) Prior Publication Data
US 2021/0297125 A1    Sep. 23, 2021

(30) Foreign Application Priority Data
Sep. 28, 2016   (JP) .............................. JP2016-188933

(51) Int. Cl.
H04B 7/06   (2006.01)
H04B 7/10   (2017.01)
H04L 7/00   (2006.01)
(52) U.S. Cl.
CPC ............. *H04B 7/0617* (2013.01); *H04B 7/10* (2013.01); *H04L 7/0033* (2013.01)

(58) Field of Classification Search
CPC ............ H04L 27/2627; H04L 27/2649; H04L 27/2602; H04B 7/0413
(Continued)

(56) References Cited

U.S. PATENT DOCUMENTS 5,208,594 A * 5/1993 Yamazaki ............... H03M 3/50
341/110
7,394,424 B1 * 7/2008 Jelinek ................. H01Q 3/2682
342/375
(Continued)

FOREIGN PATENT DOCUMENTS

JP   2001160716 A   6/2001
JP   2002057732 A   2/2002
(Continued)

OTHER PUBLICATIONS

Masaaki Tanio et al.,"An FPGA-based All-Digital Transmitter with 28-GHz Time-Interleaved Delta-Sigma Modulation", Microwave Symposium (IMS), IEEE MTT-S International, 2016 (4 pages total).
(Continued)

*Primary Examiner* — Sam K Ahn
*Assistant Examiner* — Gina M McKie

(57) ABSTRACT

This transmitter is provided with: a digital delay circuit which delays a 1-bit digital RF signal on the basis of another 1-bit digital RF signal; an amplifier which amplifies a signal output by the digital delay circuit; and a band-pass filter which allows signals in a prescribed frequency band, from among signals output by the amplifier, to pass. A signal output by the band-pass filter is input into a corresponding one antenna element from among a plurality of antenna elements, and controls the directionality of a beam formed by the plurality of antenna elements.

8 Claims, 14 Drawing Sheets

(58) Field of Classification Search
USPC .......................................................... 375/295
See application file for complete search history.

(56) References Cited

U.S. PATENT DOCUMENTS

| | | | |
|---|---|---|---|
| 2008/0240170 A1* | 10/2008 | Elmala | ................. H01Q 3/2682 |
| | | | 370/517 |
| 2012/0256805 A1 | 10/2012 | Orihashi | |
| 2013/0308656 A1 | 11/2013 | Malkin et al. | |
| 2016/0329935 A1* | 11/2016 | Singeri | ............... H04L 25/4902 |

FOREIGN PATENT DOCUMENTS

| | | | |
|---|---|---|---|
| JP | 2015525494 A | 9/2015 |
| JP | 2015186031 A | 10/2015 |
| WO | 2011078029 A1 | 6/2011 |

OTHER PUBLICATIONS

NTT DOCOMO Technical Journal, vol. 23, No. 4, Jan. 2016. ( 92 total Pages).
International Search Report dated Dec. 12, 2017, in counterpart application No. PCT/JP2017/033818.
Written Opinion of the International Searching Authority dated Dec. 12, 2017, in counterpart international application No. PCT/JP2017/033818.

* cited by examiner

OUTPUT OF ONE-bit MODULATION DEVICE 60

OUTPUT OF DIGITAL DELAY CIRCUITS 21

BEFORE D-FF CHANGE

OUTPUT OF DIGITAL DELAY CIRCUITS 21

AFTER D-FF CHANGE

TRANSMITTER AND METHOD OF CONTROLLING TRANSMITTER

This application is a National Stage Entry of PCT/JP2017/033818 filed on Sep. 20, 2017, which claims priority from Japanese Patent Application 2016-188933 filed on Sep. 28, 2016, the contents of all of which are incorporated herein by reference, in their entirety.

TECHNICAL FIELD

The present invention relates to a transmitter and a method of controlling a transmitter.

BACKGROUND ART

In recent years, with the rapid spread of wireless communication, the shortage of the wireless communication bands is a problem, and the demand for beam forming is increasing as a technique for improving spatial use efficiency of radio waves (frequency). Beam forming is a technique of giving directivity to radio waves to radiate radio waves only in a specific direction. This makes it possible to improve signal quality and suppress unnecessary radiation to other wireless devices and systems.

Beam forming in a transmitter is achieved by a transmission device with an array antenna as illustrated in FIG. 11 and FIG. 12, for example. The transmission device of FIG. 11 is constituted by a plurality of transmission blocks. Each of the transmission block (referred to as one transmission block) includes a BB (Base Band) signal generation unit, a DAC (Digital to Analog Converter), an up converter, an amplification device, a bandpass filter, and an antenna element. A radio signal fed to each antenna element has a feature of controlling a directivity of a beam by adjusting the phase and the amplitude of the radio signal in the BB signal generation unit. Unlike the configuration of the transmission device in FIG. 11, in the transmission device in FIG. 12, each of a BB signal generation unit, a DAC, and an upconverter is used commonly, and the transmission device in FIG. 12 thus includes the BB signal generation unit, the DAC, the upconverter, the same number of phase adjustment devices, amplification devices, and bandpass filters as the number of antenna elements. Only the phases of the radio signal fed to each antenna element is adjusted by a phase adjustment device, so that the feature of controlling the directivity of the beam is achieved.

An example of a transmission device related to the present invention is described in NPL 1.

Fig

An example of an antenna system related to the present invention is described in PTL 1.

An example of a transmission circuit device related to the present invention is described in PTL 2.

Citation List

Non Patent Literature

[NPL 1] NTT DOCOMO Technical Journal Vol. 23, No. 4

Patent Literature

[PTL 1] Japanese Unexamined Patent Application Publication No. 2015-186031

[PTL 2] Japanese Unexamined Patent Application Publication No. 2002-57732

SUMMARY OF INVENTION

Technical Problem

When implementing the transmission device illustrated in FIG. 11 or FIG. 12, a large number of transmission blocks are mounted densely. As a result, it is difficult to mount a wire on each transmission block with the same length, and thus the wiring lengths are different at the time of mounting. Variations in wiring length cause a synchronization deviation between the transmission blocks, leading to deterioration in signal quality such as deterioration in the accuracy in the directivity control of beams.

It is an object of the present invention to provide a transmitter and a method of controlling the transmitter which substantially improves variations in wiring length and reduces degradation of signal quality.

Solution to Problem

A transmitter, according to one aspect of the present invention, includes: a digital delay circuit delaying a one-bit digital RF signal based on another one-bit digital RF signal; an amplification device amplifying a signal output from the digital delay circuit; and a bandpass filter passing a signal of a predetermined frequency band out of the signals output from the amplification device, wherein the signal output by the bandpass filter is input to corresponding antenna element of the plurality of antenna elements and controls directivity of a beam formed by the plurality of antenna elements.

A method of controlling a transmitter, according to one aspect of the present invention, includes: delaying a one-bit digital RF signal based on another one-bit digital RF signal; amplifying the one-bit digital RF signal; inputting only a signal of a predetermined frequency band into a corresponding antenna element of the plurality of antenna elements; and controlling directivity of a beam formed by the plurality of antenna elements.

Advantageous Effects of Invention

The advantage of the present invention lies in being able to reduce degradation of signal quality of a transmitter.

EXAMPLE EMBODIMENT

Figure 1:
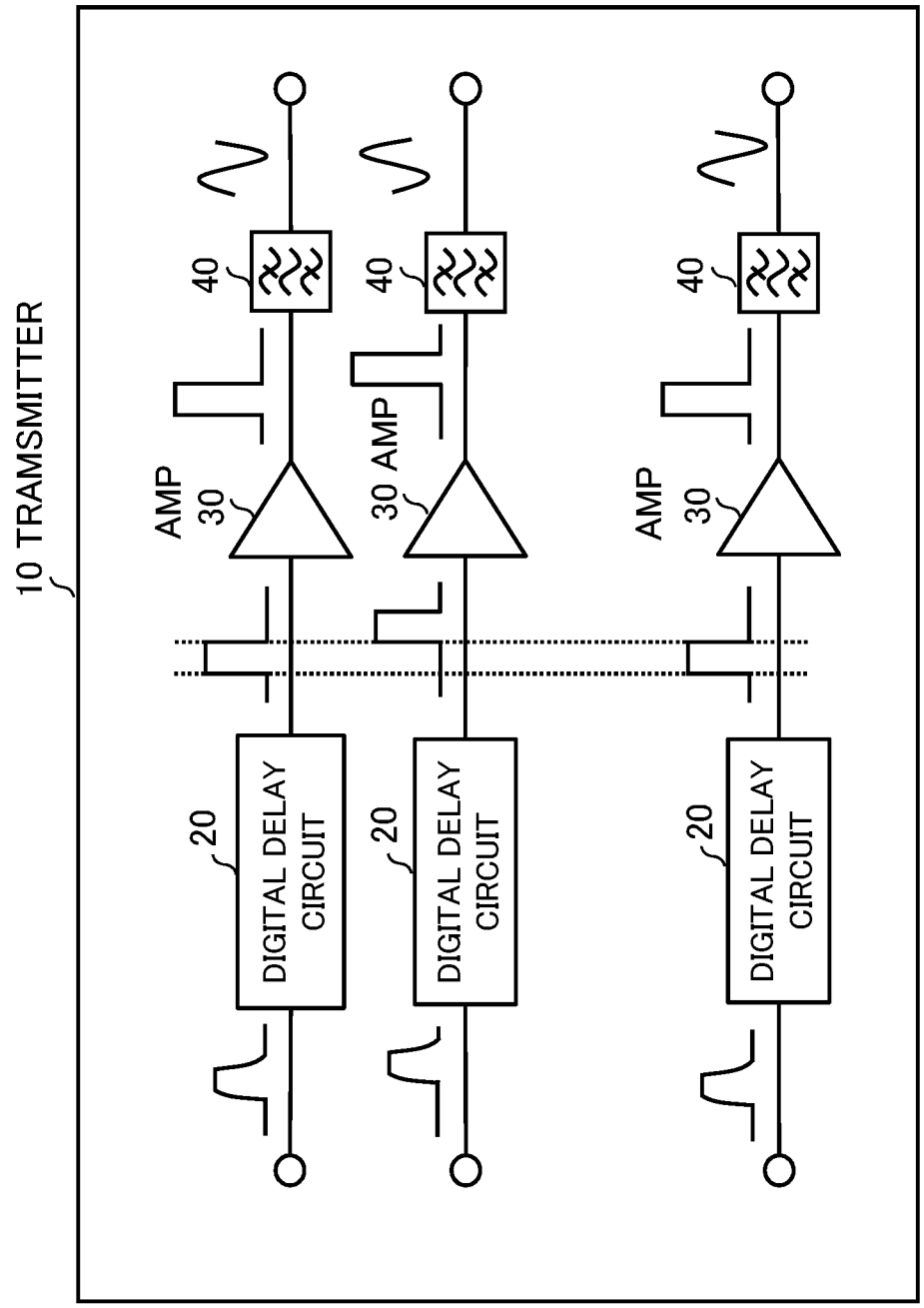
FIG. 1 is a block diagram illustrating a configuration of a transmitter 10 according to a first example embodiment of the present invention.

An example embodiment for carrying out the present invention will be described in detail with reference to the drawings. Note that, in each of the drawings and the example embodiments described in the specification, the same reference numerals are given to constituent elements having similar functions.

First Example Embodiment

FIG. 1 is a block diagram illustrating a configuration of a transmitter 10 according to a first example embodiment of the present invention.

Referring to FIG. 1, the transmitter 10 according to the first example embodiment of the present invention includes a plurality of digital delay circuits 20, a plurality of amplification devices 30, and a plurality of bandpass filters 40. The digital delay circuits 20, the amplification devices 30, and the bandpass filters 40 are provided as many as the number of antenna elements. One set of a digital delay circuit 20, an amplification device 30, and a bandpass filter 40 corresponds to one antenna element.

Each constituent element of the transmitter 10 according to the first example embodiment will be described below.

The digital delay circuit 20 receives a one-bit digital RF (Radio Frequency) signal (hereinafter referred to as one-bit signal sequence) as input. The digital delay circuit 20 performs retiming of the one-bit signal sequence and shapes the waveform of the signal sequence. The digital delay circuit 20 delays the one-bit signal sequence which is an input signal, based on the shaped waveform and the waveform of another one-bit signal sequence. The digital delay circuit 20 outputs the delayed one-bit signal sequence to the amplification device 30.

The amplification device 30 amplifies the one-bit signal sequence output from the digital delay circuit 20. The amplification device 30 outputs the amplified one-bit signal sequence to the bandpass filter 40. The amplification device 30 may be, for example, a class D amplifier that achieves high-efficiency amplification by switching. The amplification device 30 may be an AB class amplifier, a class B amplifier, a class E amplifier, a class F amplifier, a Doherty amplifier, an envelope tracking amplifier, or the like.

The bandpass filter 40 passes a signal of a predetermined frequency band from signals output from the amplification device 30. That is, the bandpass filter 40 outputs a bandpass output signal that suppresses frequency components other than frequency components in the vicinity of the carrier frequency (fc) of the input signal. The signal output from the bandpass filter 40 is input to a corresponding antenna element of the plurality of antenna elements.

The signal output from the bandpass filter 40 is used to control the directivity of beams formed by the plurality of antenna elements.

The transmitter 10 according to the first example embodiment includes a plurality of digital delay circuits 20 respectively corresponding to a plurality of antenna elements. In this way, the transmitter 10 delays the one-bit signal sequence as an input signal, based on another one-bit signal sequence, at each of the corresponding antenna elements. Thereby, the transmitter 10 can synchronize the respective output signals at the output stage of the plurality of digital delay circuits 20. That is, the transmitter 10 can substantially improve the variations in wiring length at the preceding stage of the digital delay circuit 20, and can reduce deterioration of the signal quality.

Second Example Embodiment

Figure 2:
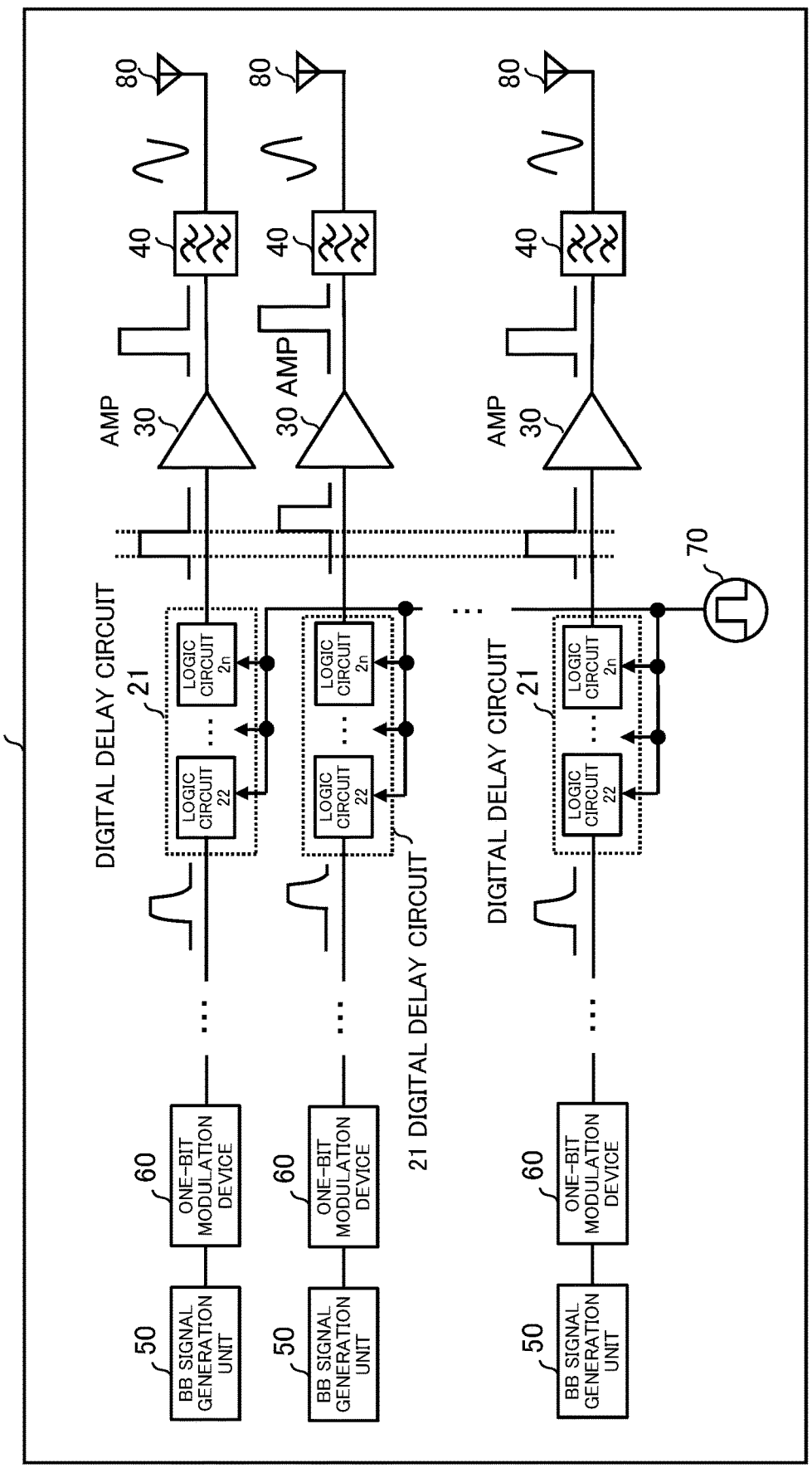
FIG. 2 is a block diagram illustrating a configuration of a transmitter 11 according to a second example embodiment of the present invention.

FIG. 2 is a block diagram illustrating a configuration of a transmitter 11 according to a second example embodiment of the present invention.

Referring to FIG. 2, the transmitter 11 according to the second example embodiment of the present invention includes a plurality of BB (baseband) signal generation units 50, a plurality of one-bit modulation devices 60, a plurality of digital delay circuits 21, a clock generation unit 70, a plurality of amplification devices 30, a plurality of bandpass filters 40, and a plurality of antennas 80. As in the first example embodiment, the digital delay circuits 21, the amplification devices 30, and the bandpass filters 40 are provided as many as the number of antennas 80. One set of a digital delay circuit 21, an amplification device 30, and a bandpass filter 40 corresponds to one antenna 80.

Hereinafter, each constituent element of the transmitter 11 according to the second example embodiment will be described below.

The BB signal generation unit 50 generates and outputs a BB signal. In order to control the directivity of the beam formed by the plurality of antennas 80, the amplitude value and the phase value of the BB signal output from the BB signal generation unit 50 may be adjusted independently.

Figure 3:
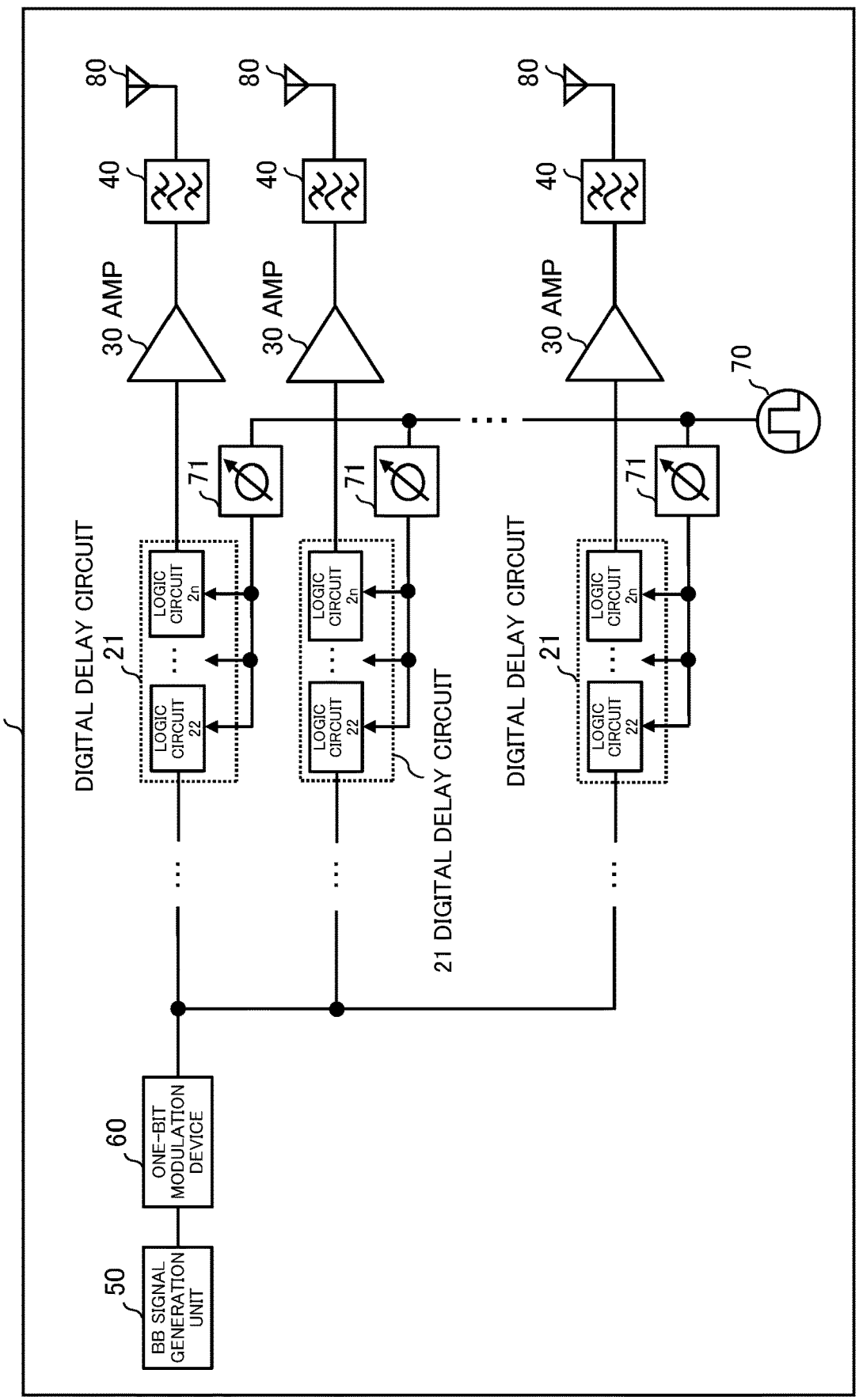
FIG. 3 is a block diagram illustrating a configuration of a transmitter 12 according to a third example embodiment of the present invention.

As illustrated in FIG. 2, the transmitter 11 may include the same number of BB signal generation units 50 as the number of the antennas 80 or may include a smaller number of BB signal generation units than the number of antennas 80. That is, the transmitter 11 may include one BB signal generation unit 50 as illustrated in FIG. 3. When the number of BB signal generation units 50 is less than the number of antennas 80, the transmitter 11 can reduce the number of components.

The one-bit modulation device 60 converts the BB signal output from the BB signal generation unit 50 into a one-bit digital RF signal (hereinafter referred to as a one-bit signal sequence). That is, the one-bit modulation device 60 up-converts the BB signal to an RF signal and quantizes the RF signal. Quantization means performing, for example, lowpass ΔΣ modulation, band pass ΔΣ modulation, PWM (Pulse Width Modulation) modulation or the like. The one-bit modulation device 60 outputs the one-bit signal sequence to the digital delay circuit 21.

As illustrated in FIG. 2, the transmitter 11 may include the same number of one-bit modulation devices 60 as the number of antennas 80, or may include a smaller number of one-bit modulation devices 60 than the number of antennas 80. That is, the transmitter 11 may have one one-bit modulation device 60 as illustrated in FIG. 3. When the number of one-bit modulation devices 60 is less than the number of antennas 80, the transmitter 11 can reduce the number of components. In this case, the output signals of the one-bit modulation devices 60 are divided into as many as the number of the antennas 80 to be input to the respective digital delay circuits 21.

The digital delay circuit 21 is constituted by one logic circuit 22 or is constituted by a plurality of logic circuits 22, 23, . . . , 2n (n is an integer of 2 or more) connected in series. Like the digital delay circuit 20 according to the first example embodiment, the digital delay circuit 21 delays the one-bit signal sequence output from the one-bit modulation device 60, on the basis of another one-bit signal sequence, and outputs the delayed one-bit signal sequence to the amplification device 30.

The logic circuits 22, 23, . . . , 2n performs retiming of the input one-bit signal sequence and shape the waveform of the signal sequence. The logic circuits 22, 23, . . . , 2n delay the input one-bit signal sequence, based on the clock generated by the clock generation unit 70. The logic circuits 22, 23, . . . , 2n may be, for example, a D-FF (Delay Flip-Flop) circuit that captures an input signal in accordance with the rise of the clock. The logic circuits 22, 23, . . . , 2n may be replaced with flip-flop circuits other than the D-FF circuit, a latch circuit, or the like.

The number of the logic circuits 22, 23, . . . , 2n included in one digital delay circuit 21 is set in such a way that signals are synchronized from one another at the output stage of the plurality of digital delay circuits 21, based on the waveform of the one-bit signal sequence input to the digital delay circuit 21 and the waveform of another one-bit signal sequence input to another digital delay circuit 21. For example, when the waveform of the one-bit signal sequence input to the digital delay circuit 21 is ahead of the waveform of another one-bit signal sequence input to another digital delay circuit 21, the number of logic circuits of the digital delay circuit 21 is appropriately set larger than the number of logic circuits of another digital delay circuits 21. Each of the plurality of digital delay circuits 21 includes the different number of the logic circuits 22, 23, . . . , 2n from one another.

The clock generation unit 70 generates a clock having a frequency which is an integral multiple of the bit rate of the one-bit signal sequence output from the one-bit modulation device 60. The clock generation unit 70 outputs the generated clock to the logic circuits 22, 23, . . . , 2n.

Like the first example embodiment, the amplification device 30 amplifies the one-bit signal sequence output from the digital delay circuit 21.

Like the first example embodiment, the bandpass filter 40 passes a signal of a predetermined frequency band out of signals output from the amplification device 30.

The antenna 80 radiates an electromagnetic wave to the space based on the bandpass output signal output from the bandpass filter 40. As illustrated in FIG. 2, the transmitter 11 includes a plurality of antennas 80. The plurality of antennas 80 radiate electromagnetic waves (beams) having directivity, based on band pass output signals input to the respective antennas 80.

Hereinafter, a method of setting the number of D-FFs when the logic circuits 22, 23, . . . , 2n are D-FFs will be described.

Figure 9:
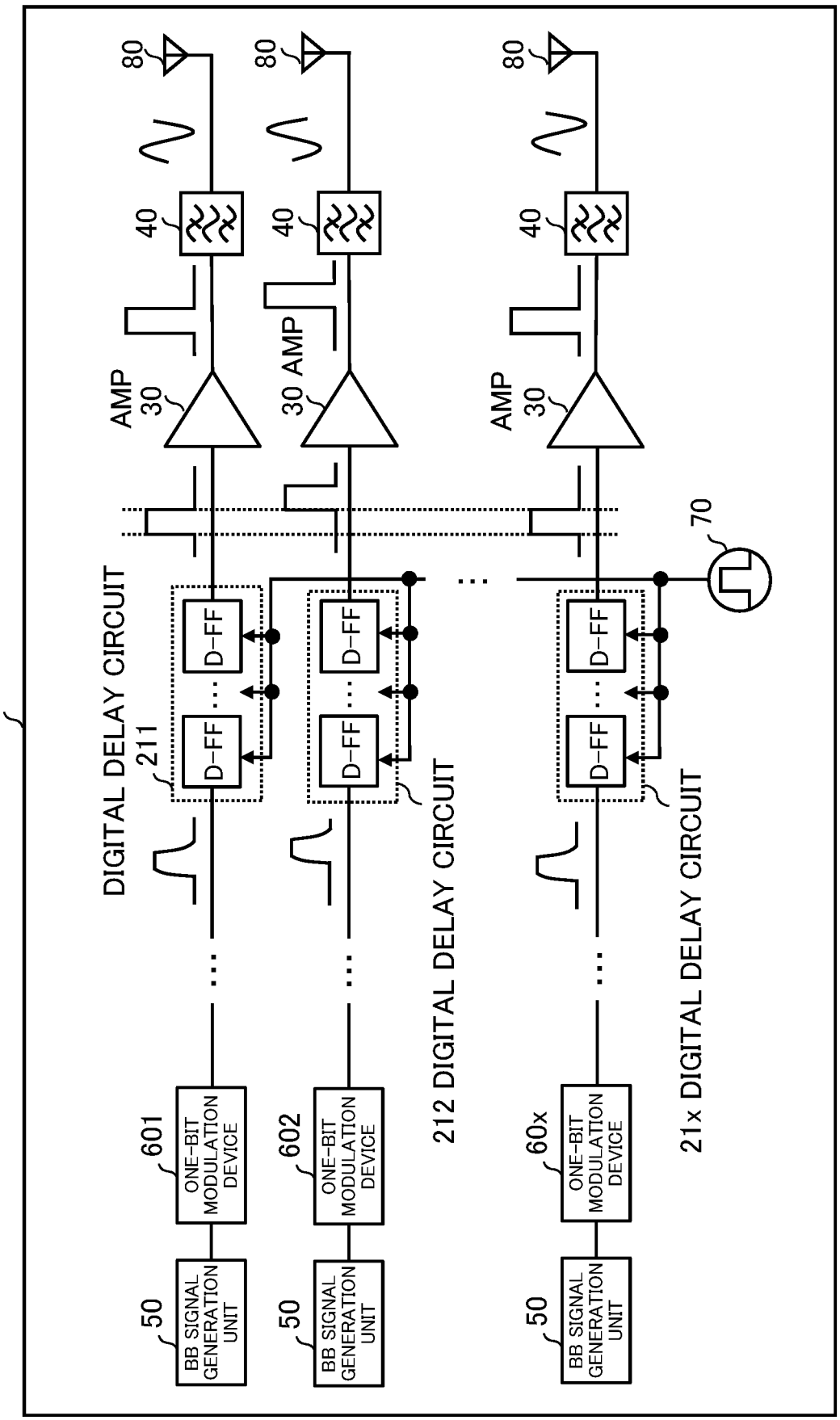
FIG. 9 is a block diagram illustrating the configuration of the transmitter 11 according to the second example embodiment of the present invention.

The D-FF is set such that the output signals from the digital delay circuits 21 are synchronized with one another. For example, referring to FIG. 9, when the wire connecting the one-bit modulation device 601 and the digital delay circuit 211 is longer than the wire connecting the one-bit modulation device 602 and the digital delay circuit 212, the synchronization between the one-bit modulation devices 601, 602 cannot be achieved. However, by setting the number of D-FFs of the digital delay circuit 212 appropriately larger than the digital delay circuit 211 in accordance with the difference in wiring length, the output signals can be synchronized at the output stage of the plurality of digital delay circuits 21.

Figure 8A:
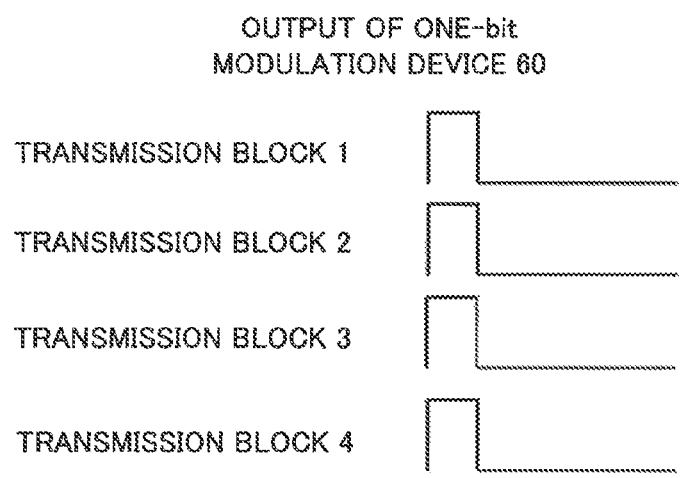
FIG. 8A is a diagram for explaining operation of a digital delay circuit 21 according to the present invention.
Figure 8B:
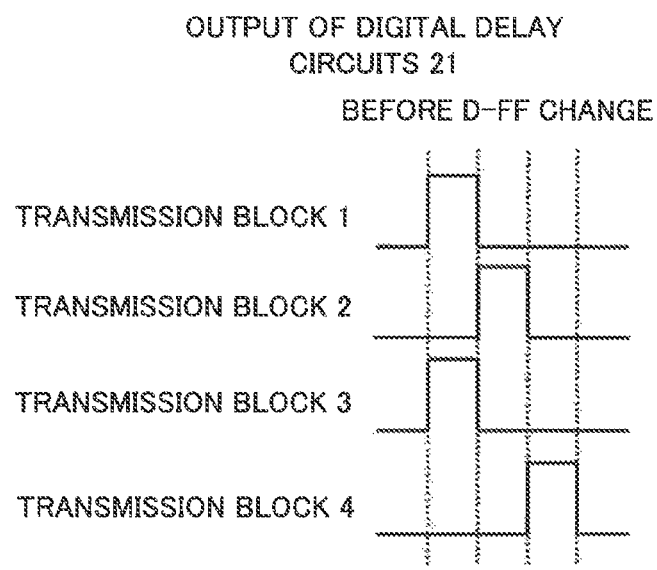
FIG. 8B is a diagram for explaining operation of a digital delay circuit 21 according to the present invention.
Figure 8C:
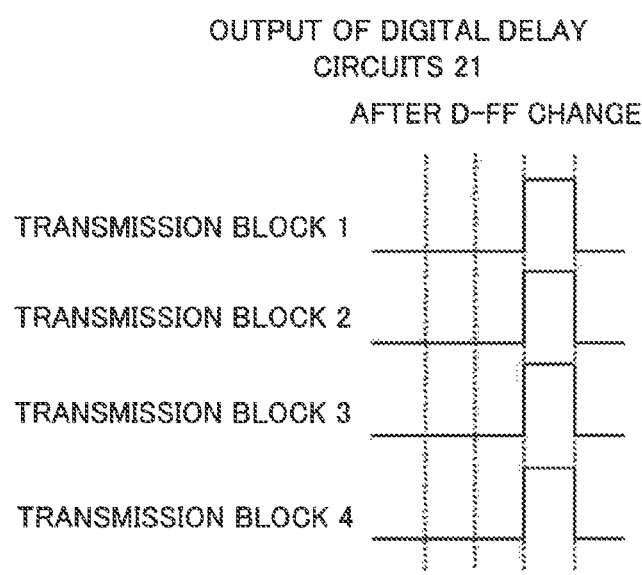
FIG. 8C is a diagram for explaining operation of a digital delay circuit 21 according to the present invention.

Here, a concrete method of setting the number of D-FFs will be described with reference to FIGS. 8A, 8B, and 8C. Note that it is assumed that the number of transmission blocks is four at this time. As the initial setting, the outputs of the one-bit modulation devices 60 are (temporarily) changed so as to output, in synchronization, a data sequence yielding a value of 1 for one clock at a certain timing and thereafter yielding a value of zero as illustrated in FIG. 8A. At this time, as illustrated in FIG. 8B, data transition (0 to 1) timings in the output data sequence are different in the digital delay circuits 21 due to variations in wiring length. That is, it can be confirmed that synchronization is not established. Based on this result, two D-FFs are added to the digital delay circuit 211, one D-FF is added to the digital delay circuit 212, and two D-FFs are added to the digital delay circuit 213. As a result, the outputs of the synchronized digital delay circuits 21 as illustrated in FIG. 8C are obtained. After that, the outputs of the one-bit modulation devices 60 operated as usual are input to the respective digital delay circuits 21, each of the digital delay circuits 21 being set the number of D-FFs as described above, and thus transmission synchronized at all times can be performed.

The transmitter 11 according to the second example embodiment is provided with one or more logic circuits 22, 23, . . . , 2n in the digital delay circuit 21. In this way, the transmitter 11 delays the one-bit signal sequence which is the input signal of the digital delay circuit 21, on the basis of another one-bit signal sequence which is the input signal of another digital delay circuit 21. That is, the transmitter 11 sets the number of the logic circuits 22, 23, . . . , 2n for each digital delay circuit 21 based on the length of the wire connecting the one-bit modulation device 60 and the digital delay circuit 21. Thus, the respective output signals can be synchronized at the output stage of the digital delay circuit 21. Therefore, the transmitter 11 can substantially improve the variations in the wiring length at the preceding stage of the digital delay circuits 21, and reduce deterioration of the signal quality.

Third Example Embodiment

FIG. 3 is a block diagram illustrating a configuration of a transmitter 12 according to a third example embodiment of the present invention. Referring to FIG. 3, the transmitter 12 according to the third example embodiment of the present invention includes a BB signal generation unit 50, a one-bit modulation device 60, a plurality of digital delay circuits 21, a clock generation unit 70, a plurality of phase adjustment devices 71, a plurality of amplification devices 30, a plurality of bandpass filters 40, and a plurality of antennas 80. The difference between the transmitter 12 according to the third example embodiment of the present invention and the transmitter 11 according to the second example embodiment is that the transmitter 12 has a phase adjustment device 71 between the clock generation unit 70 and the digital delay circuit 21. Like the second example embodiment, the digital delay circuit 21, the amplification device 30, and the bandpass filter 40 are provided as many as the number of the antennas 80. One set of a digital delay circuit 21, an amplification device 30, and a bandpass filter 40 corresponds to one antenna 80.

Each constituent element of the transmitter 12 according to the third example embodiment will be described below.

Like the second example embodiment, the BB signal generation unit 50 generates and outputs a BB signal. In the present example embodiment, there is one BB signal generation unit 50, but as illustrated in FIG. 2, a plurality of BB signal generation units 50 may be used. When the number of BB signal generation units 50 is one or less than the number of antennas 80, the transmitter 12 can reduce the number of components.

Like the second example embodiment, the one-bit modulation device 60 converts the BB signal output from the BB signal generation unit 50 into a one-bit digital RF signal (hereinafter referred to as a one-bit signal sequence). In the present example embodiment, there is one one-bit modulation device 60, but as illustrated in FIG. 2, a plurality of one-bit modulation devices 60 may be used. When the number of one-bit modulation devices 60 is less than one or antenna 80, the transmitter 12 can reduce the number of components. In this case, the output signals of the one-bit modulation devices 60 are divided into as many as the number of the antennas 80 to be input to the respective digital delay circuits 21.

Like the second example embodiment, the digital delay circuit 21 is constituted by one logic circuit 22 or by a plurality of logic circuits 22, 23, . . . , 2n (n is an integer of 2 or more) connected in series. The digital delay circuit 21 delays the input one-bit signal sequence based on the one-bit signal sequence input to another digital delay circuit 21 and outputs the delayed input one-bit signal sequence to the amplification device 30.

Like the second example embodiment, the clock generation unit 70 generates a clock having a frequency that is an integral multiple of the bit rate of the one-bit signal sequence output from the one-bit modulation device 60.

The phase adjustment device 71 receives the clock generated by the clock generation unit 70 as an input and outputs a clock having a predetermined phase adjusted. The clock output from the phase adjustment device 71 is input to the logic circuits 22, 23, . . . , 2n. As illustrated in FIG. 3, a plurality of phase adjustment devices 71 are provided. Each phase adjustment device 71 corresponds to any one of the plurality of digital delay circuits 21. The phase values of the plurality of phase adjustment devices 71 are different among the phase adjustment devices 71, and are set so as to control the directivity of the beams formed by the plurality of antennas 80.

Like the first example embodiment, the amplification device 30 amplifies the one-bit signal sequence output from the digital delay circuit 21.

Like the first example embodiment, the bandpass filter 40 passes a signal of a predetermined frequency band out of signals output from the amplification device 30.

Like the second example embodiment, the antenna 80 radiates electromagnetic waves to the space based on the bandpass output signal output from the bandpass filter 40.

The transmitter 12 according to the third example embodiment can control the directivity of the beams formed by the plurality of antennas 80 by providing the phase adjustment devices 71. Further, the transmitter 12 is provided with one or more logic circuits 22, 23, . . . , 2n in the digital delay circuit 21. In this way, the transmitter 12 delays the one-bit signal sequence which is the input signal of the digital delay circuit 21, on the basis of another one-bit signal sequence which is the input signal of another digital delay circuit 21. That is, the transmitter 11 sets the number of the logic circuits 22, 23, . . . , 2n for each digital delay circuit 21 based on the length of the wire connecting the one-bit modulation device 60 and the digital delay circuit 21. Thus, the respective output signals can be synchronized at the output stage of the digital delay circuit 21. Therefore, the transmitter 11 can substantially improve the variations in the wiring length at the preceding stage of the digital delay circuits 21, and reduce deterioration of the signal quality.

Fourth Example Embodiment

Figure 4:
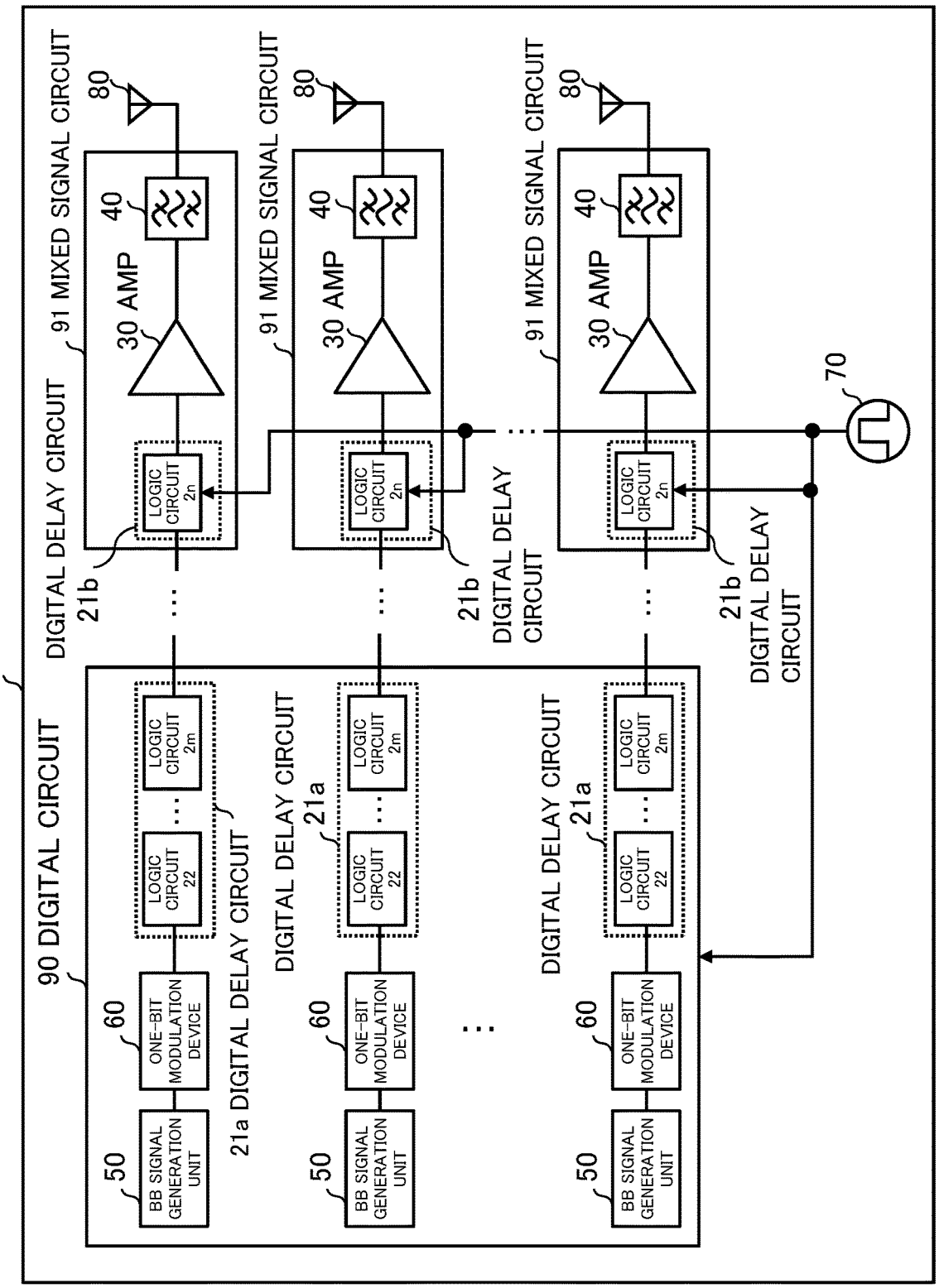
FIG. 4 is a block diagram illustrating a configuration of a transmitter 13 according to a fourth example embodiment of the present invention.

FIG. 4 is a block diagram illustrating a configuration of a transmitter 13 according to a fourth example embodiment of the present invention. Referring to FIG. 4, the transmitter 13 according to the fourth example embodiment of the present invention includes a digital circuit 90, a clock generation unit 70, a plurality of mixed signal circuits 91, and a plurality of antennas 80. The mixed signal circuits 91 and the antennas 80 are provided in the same number. The digital circuit 90 includes a plurality of BB signal generation units 50, a plurality of one-bit modulation devices 60, and a plurality of digital delay circuits 21a. The mixed signal circuit 91 includes a digital delay circuit 21b, an amplification device 30, and a bandpass filter 40. The transmitter 13 according to the fourth example embodiment of the present invention is a configuration in which the transmitter 11 according to the second example embodiment is made into more concrete from the viewpoint of implementation.

Each constituent element of the transmitter 13 according to the fourth example embodiment will be described below.

The digital circuit 90 includes a BB signal generation unit 50, a one-bit modulation device 60, and a digital delay circuit 21a. The digital circuit 90 operates an internal circuit (the BB signal generation unit 50, the one-bit modulation device 60, and the digital delay circuit 21a) of the digital circuit 90 based on the clock generated by the clock generation unit 70.

Like the second example embodiment, the BB signal generation unit 50 generates and outputs a BB signal.

As illustrated in FIG. 4, the transmitter 13 may include the same number of BB signal generation units 50 as the plurality of antennas 80 or may include a smaller number of BB signal generation units than the plurality of antennas 80. That is, the transmitter 13 may include one BB signal generation unit 50 as illustrated in FIG. 3. When the number of BB signal generation units 50 is less than the number of antennas 80, the transmitter 13 can reduce the number of components.

Like the second example embodiment, the one-bit modulation device 60 converts the BB signal output from the BB signal generation unit 50 into a one-bit digital RF signal (hereinafter referred to as a one-bit signal sequence).

As illustrated in FIG. 4, the transmitter 13 may be provided with the same number of one-bit modulation devices 60 as the plurality of antennas 80 or may be provided with a smaller number of one-bit modulation devices 60 than the plurality of antennas 80. That is, the transmitter 13 may include one one-bit modulation device 60 as illustrated in FIG. 3. When the number of one-bit modulation devices 60 is less than the number of antennas 80, the transmitter 13 can reduce the number of components. In this case, the output signals of the one-bit modulation devices 60 are divided into as many as the number of the antennas 80 to be input to the respective digital delay circuits 21a.

Like the digital delay circuit 21 according to the second example embodiment, the digital delay circuit 21a is constituted by one logic circuit 22 or by a plurality of logic circuits 22, 23, . . . , 2m (m is an integer of 2 or more satisfying m<N) connected in series. The digital delay circuit 21a delays the input one-bit signal sequence based on the one-bit signal sequence input to another digital delay circuit 21 and outputs the delayed one-bit signal sequence to the amplification device 30.

Like the clock generation unit 70 in the second example embodiment, the clock generation unit 70 generates a clock having a frequency which is an integral multiple of the bit rate of the one-bit signal sequence output from the one-bit modulation device 60. The clock generation unit 70 may use, for example, a frequency that is changed by a dividing circuit or a multiplier circuit.

The mixed signal circuit 91 includes a digital delay circuit 21b, an amplification device 30, and a bandpass filter 40. The mixed signal circuit 91 delays the one-bit signal sequence output from the digital circuit 90 based on another one-bit signal sequence and inputs the delayed signal to the corresponding one of the plurality of antennas 80.

Like the digital delay circuit 21 according to the second example embodiment, the digital delay circuit 21b is constituted by one logic circuit 2 (m+1) or is constituted by a plurality of logic circuits 2 (m+1), 2 (m+2), . . . , 2n connected in series. The digital delay circuit 21b delays the input one-bit signal sequence based on the one-bit signal sequence input to another digital delay circuit 21b and outputs the delayed input one-bit signal to the amplification device 30. A combination of the digital delay circuit 21a and the digital delay circuit 21b corresponds to the digital delay circuit 21 according to the second example embodiment.

The digital delay circuit 21b may be constituted by, for example, one logic circuit 2n (n=m+1). In this case, the number of logic circuits for synchronization is adjusted in the digital delay circuit 21a. As with the method of setting the number of D-FFs according to the second example embodiment, the method for setting the number of the logic circuits 22, 23, . . . , 2m is set so that the output signals of the plurality of digital delay circuits 21b are synchronized with each other.

Likewise, the digital delay circuit 21a may be constituted by one logic circuit 2m (i.e., the logic circuit 22). In this case, the number of logic circuits for synchronization is adjusted in the digital delay circuit 21b. Similar to the method for setting the number of D-FFs according to the second example embodiment, the number of logic circuits 2 (m+1), . . . , 2n is set so that the output signals of the plurality of digital delay circuits 21b are synchronized.

Like the first example embodiment, the amplification device 30 amplifies the one-bit signal sequence outputted by the digital delay circuit 21b.

As in the first example embodiment, the bandpass filter 40 passes a signal of a predetermined frequency band out of signals output from the amplification device 30.

Like the second example embodiment, the antenna 80 radiates electromagnetic waves to the space based on the bandpass output signal output from the bandpass filter 40.

Figure 5A:
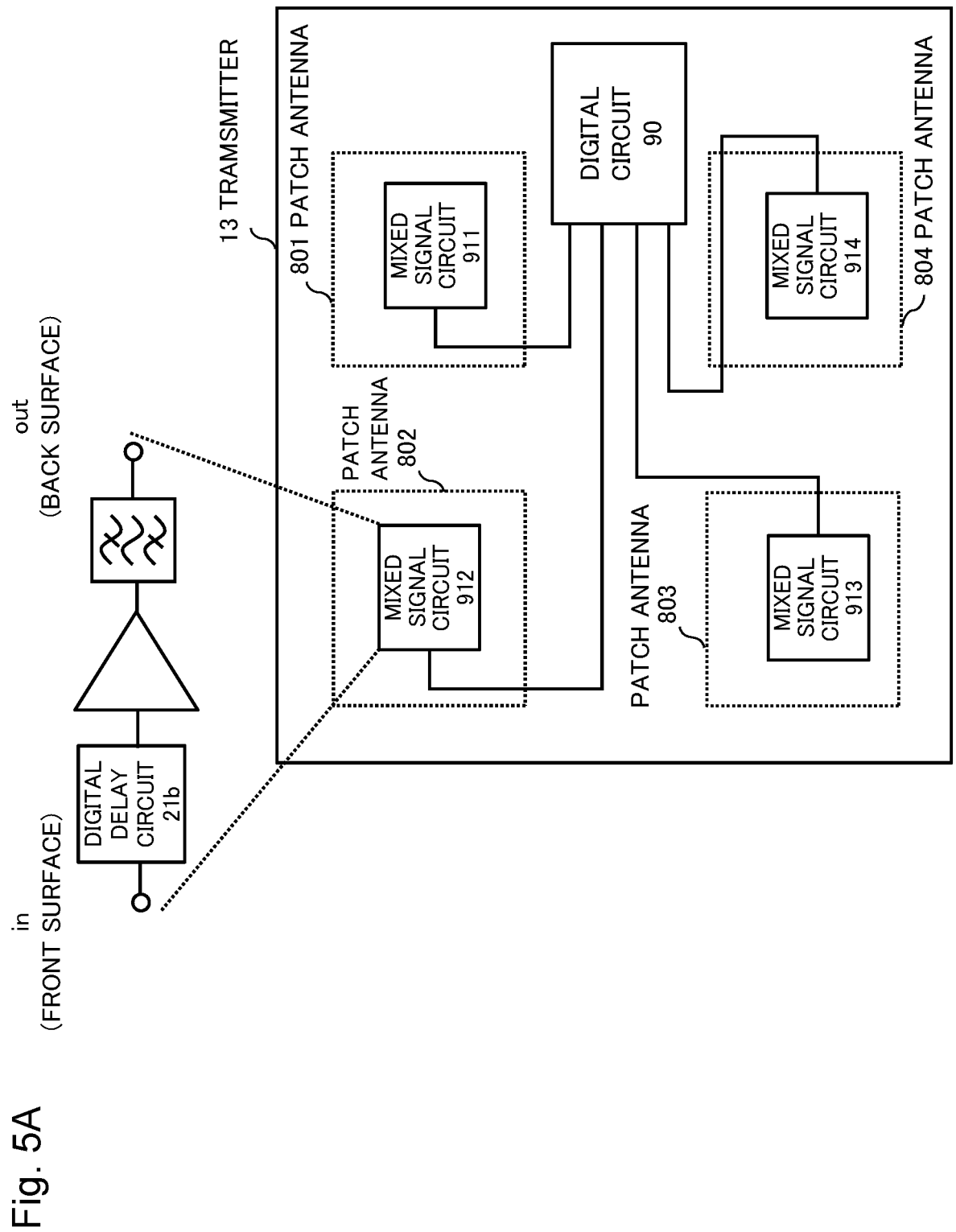
FIG. 5A is a diagram illustrating a specific example of a transmitter 13 according to the fourth example embodiment of the present invention.
Figure 5B:
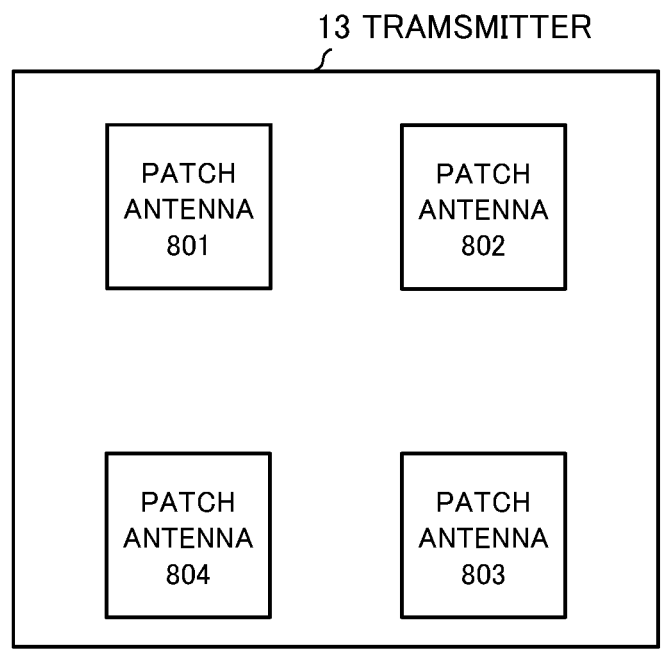
FIG. 5B is a diagram illustrating a specific example of a transmitter 13 according to the fourth example embodiment of the present invention.

FIGS. 5A and 5B illustrate a state in which the digital circuit 90, the mixed signal circuit 91, and the antenna 80 described above are implemented on a substrate. The correspondence between FIGS. 5A, 5B and FIG. 4 will be described below.

FIGS. 5A and 5B illustrate the substrate when the number of antennas is 4 in FIG. 4 and the antenna 80 is constituted by a patch antenna.

FIG. 5 (a) is a plan view illustrating a substrate front surface, and FIG. 5 (b) is a plan view illustrating a substrate back surface. On the substrate front surface, four mixed signal circuits 911, 912, . . . , 914 are respectively mounted on the back surfaces of the corresponding patch antennas 801, 802, . . . , 804. The one-bit signal sequence input to the four mixed signal circuits 911, 912, . . . , 914 is output from the digital circuit 90.

The connection between the digital circuit 90 and each of the four mixed signal circuits 911, 912, . . . , 914 can be freely designed without considering the synchronization deviation due to the difference in wiring length and the signal attenuation due to the wires. Because even when signal attenuation occurs due to the wires described above, the waveform shaping is performed in the digital delay circuits 21b in mixed signal circuits 911, 912, . . . , 914, and, for the signal synchronization, an appropriate number of logic circuits according to variations in wiring length is selected in the digital delay circuit 21a in the digital circuit 90, so that the signals can be synchronized between mixed signal circuits 911, 912, . . . , 914. Furthermore, the mixed signal circuits 911, 912, . . . , 914 are arranged in the immediate vicinity of the patch antennas 801, 802, . . . , 804, and therefore, the signal quality between the mixed signal circuits 911, 912, . . . , 914 and the patch antennas 801, 802, . . . , 804 hardly deteriorates due to the wires.

Note that, in the above configuration, the antenna is not limited to the patch antenna, and the number is not limited to four, and the configuration can be easily extended to a plurality of antennas.

Note that the above-described configuration is not limited to the example embodiment of the first and second example embodiments, and includes a configuration that embodies the third example embodiment. In that case, the mixed signal circuit 91 includes the phase adjustment device 71 in FIG. 3 in addition to the components (the digital delay circuit 21b, the amplification device 30, and the bandpass filter 40) according to the present example embodiment.

Since the transmitter 13 according to the fourth example embodiment performs delay adjustment in the mixed signal circuit 91, the respective output signals can be synchronized at the output stages of the plurality of mixed signal circuits 91. Therefore, the transmitter 13 can substantially improve the variations in wiring length at the preceding stage of the mixed signal circuit 91, and can reduce deterioration of the signal quality.

Fifth Example Embodiment

Figure 6:
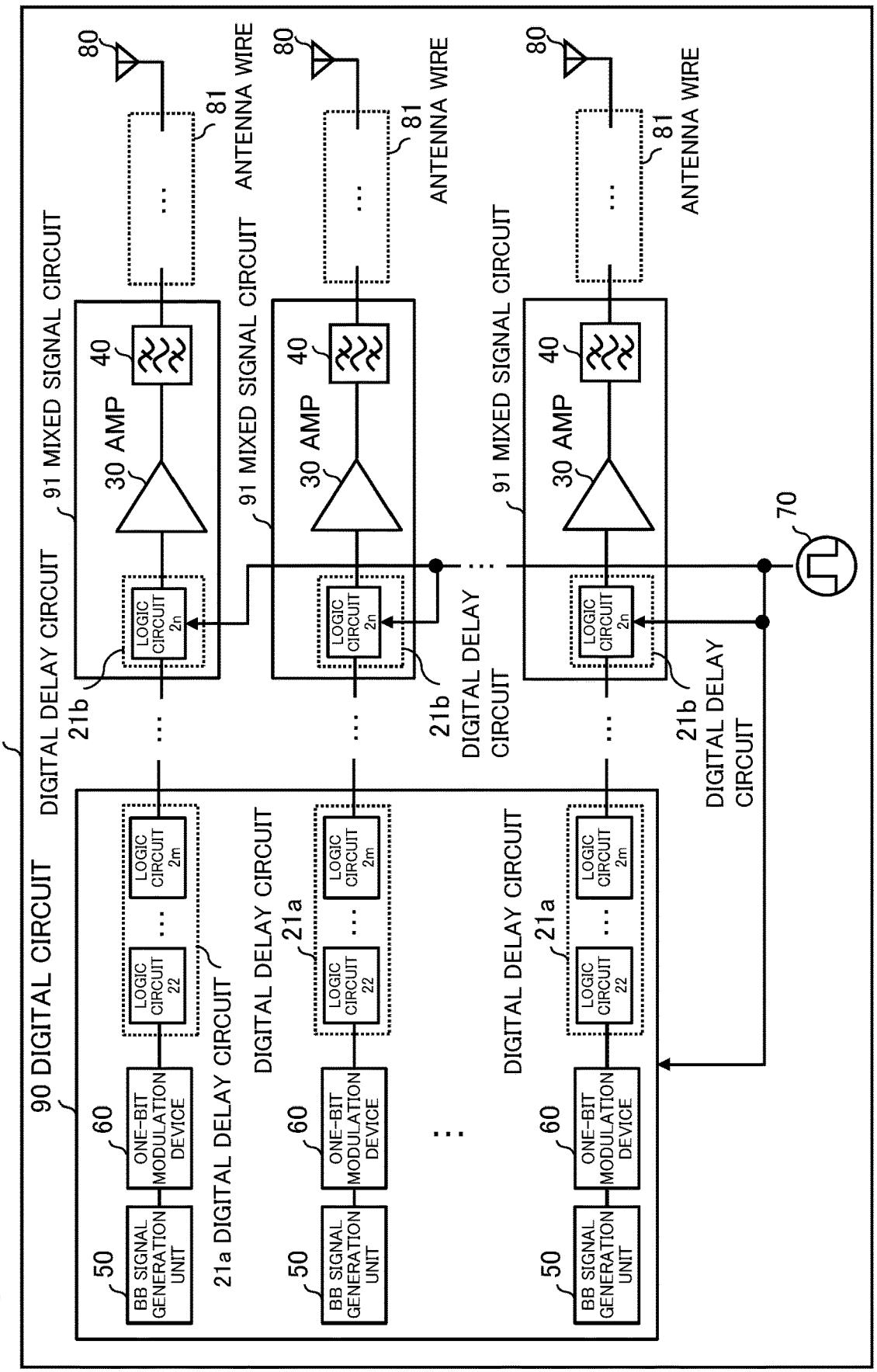
FIG. 6 is a block diagram illustrating a configuration of a transmitter 14 according to a fifth example embodiment of the present invention.

FIG. 6 is a block diagram illustrating a configuration of a transmitter 14 according to a fifth example embodiment of the present invention. Referring to FIG. 6, the transmitter 14 according to the fifth example embodiment of the present invention includes a digital circuit 90, a clock generation unit 70, a plurality of mixed signal circuits 91, a plurality of antenna wires 81, and a plurality of antennas 80. Each of the mixed signal circuit 91, the antenna wire 81, and the antenna 80 is provided in the same number. Like the fourth example embodiment, the digital circuit 90 includes a plurality of BB signal generation units 50, a plurality of one-bit modulation devices 60, and a plurality of digital delay circuits 21a. Like the fourth example embodiment, the mixed signal circuit 91 includes a digital delay circuit 21b, an amplification device 30, and a bandpass filter 40. The transmitter 14 according to the fifth example embodiment of the present invention is designed to relax the condition of the same length and the shortest wire between the mixed signal circuit 91 and the antenna 80, which was the prerequisite for the transmitter 13 in the fourth example embodiment.

Each constituent element of the transmitter 14 according to the fifth example embodiment will be described below.

Like the fourth example embodiment, the digital circuit 90 operates an internal circuit (the BB signal generation unit 50, the one-bit modulation device 60, and the digital delay circuit 21a) of the digital circuit 90 based on the clock output from the clock generation unit 70.

Like the second example embodiment, the BB signal generation unit 50 generates and outputs a BB signal.

As illustrated in FIG. 6, the transmitter 14 may include the same number of BB signal generation units 50 as the plurality of antennas 80 or may include smaller number of BB signal generation units than the plurality of antennas 80. That is, the transmitter 14 may include one BB signal generation unit 50 as illustrated in FIG. 3. When the number of BB signal generation units 50 is less than the number of antennas 80, the transmitter 14 can reduce the number of components.

Like the second example embodiment, the one-bit modulation device 60 converts the BB signal output from the BB signal generation unit 50 into a one-bit digital RF signal (hereinafter referred to as a one-bit signal sequence).

As illustrated in FIG. 6, the transmitter 14 may include the same number of the plurality of antennas 80 or may include a smaller number of one-bit modulation devices 60 than the plurality of antennas 80. That is, the transmitter 14 may include one one-bit modulation device 60 as illustrated in FIG. 3. When the number of one-bit modulation devices 60 is less than the number of antennas 80, the transmitter 14 can reduce the number of components. In this case, the output signals of the one-bit modulation devices 60 are divided into as many as the number of the antennas 80 to be input to the respective digital delay circuits 21a.

Like the digital delay circuit 21a according to the fourth example embodiment, the digital delay circuit 21a delays the input one-bit signal sequence based on the one-bit signal sequence input to another digital delay circuit 21, and outputs the delayed input one-bit signal sequence to amplification device 30.

Like the clock generation unit 70 according to the fourth example embodiment, the clock generation unit 70 generates a clock having a frequency which is an integral multiple of the bit rate of the one-bit signal sequence output from the one-bit modulation device 60.

Like the fourth example embodiment, the mixed signal circuit 91 delays the one-bit signal sequence output from the digital circuit 90 based on the other one-bit signal sequence, and inputs the delayed signal to the corresponding one of the plurality of antennas 80.

Like the digital delay circuit 21b according to the fourth example embodiment, the digital delay circuit 21b not only delays the input one-bit signal sequence based on the one-bit signal sequence input to another digital delay circuit 21b, but also delays the one-bit signal sequence in view of the length of the antenna wire 81. A combination of the digital delay circuit 21a and the digital delay circuit 21b corresponds to the digital delay circuit 21 according to the second example embodiment.

The antenna wire 81 is a wire connecting between the mixed signal circuit 91 and the antenna 80. The antenna wire 81 is designed such that the differences in wiring length from one another are an integral multiple of the wavelength of the clock frequency output from the clock generation unit 70. Due to this setting, the delay-time difference of the signal caused only at the antenna wire 81 will be an integral multiple of the clock period.

Figure 10:
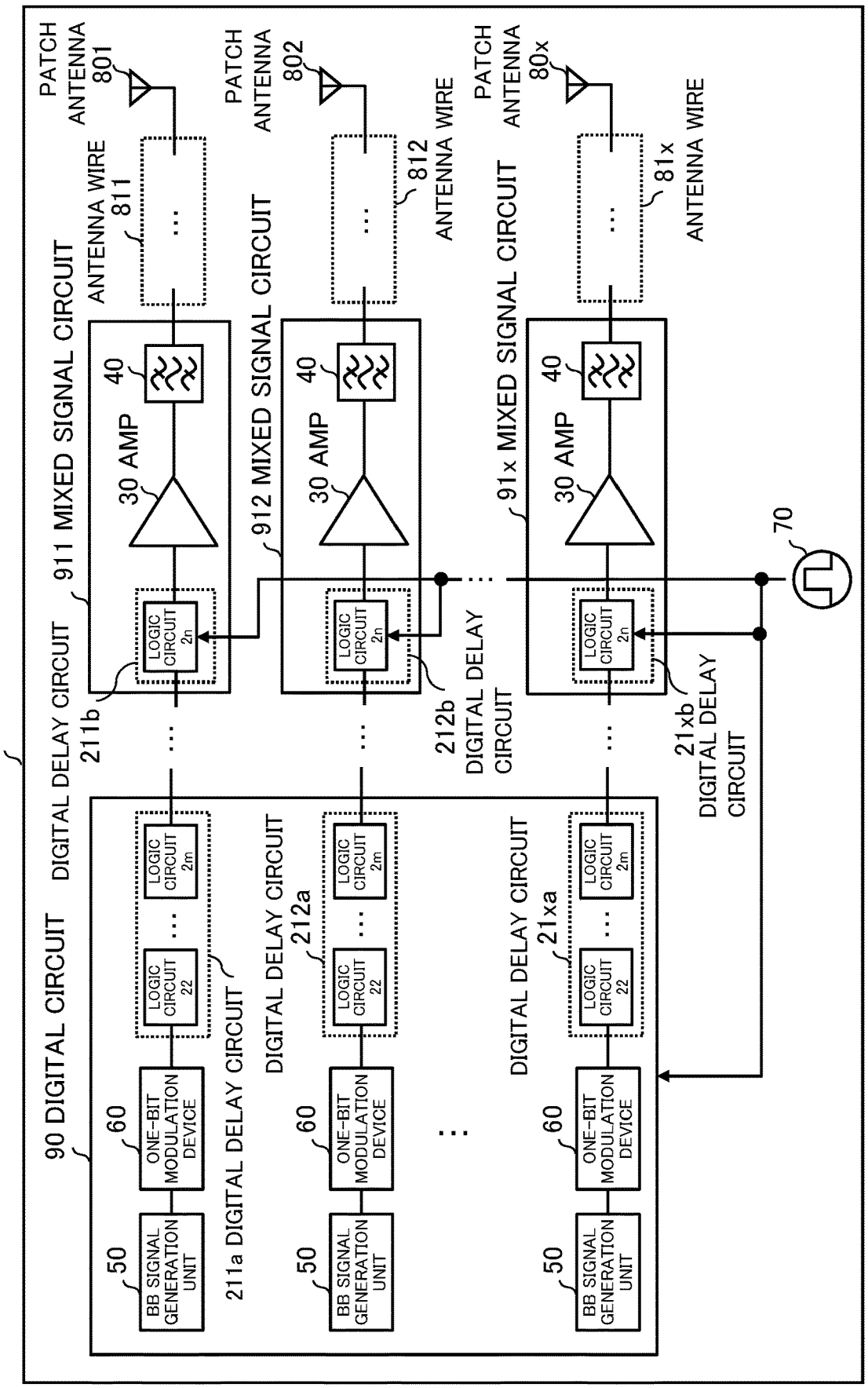
FIG. 10 is a block diagram illustrating a configuration of the transmitter 14 according to the fifth example embodiment of the present invention.
Figure 11:
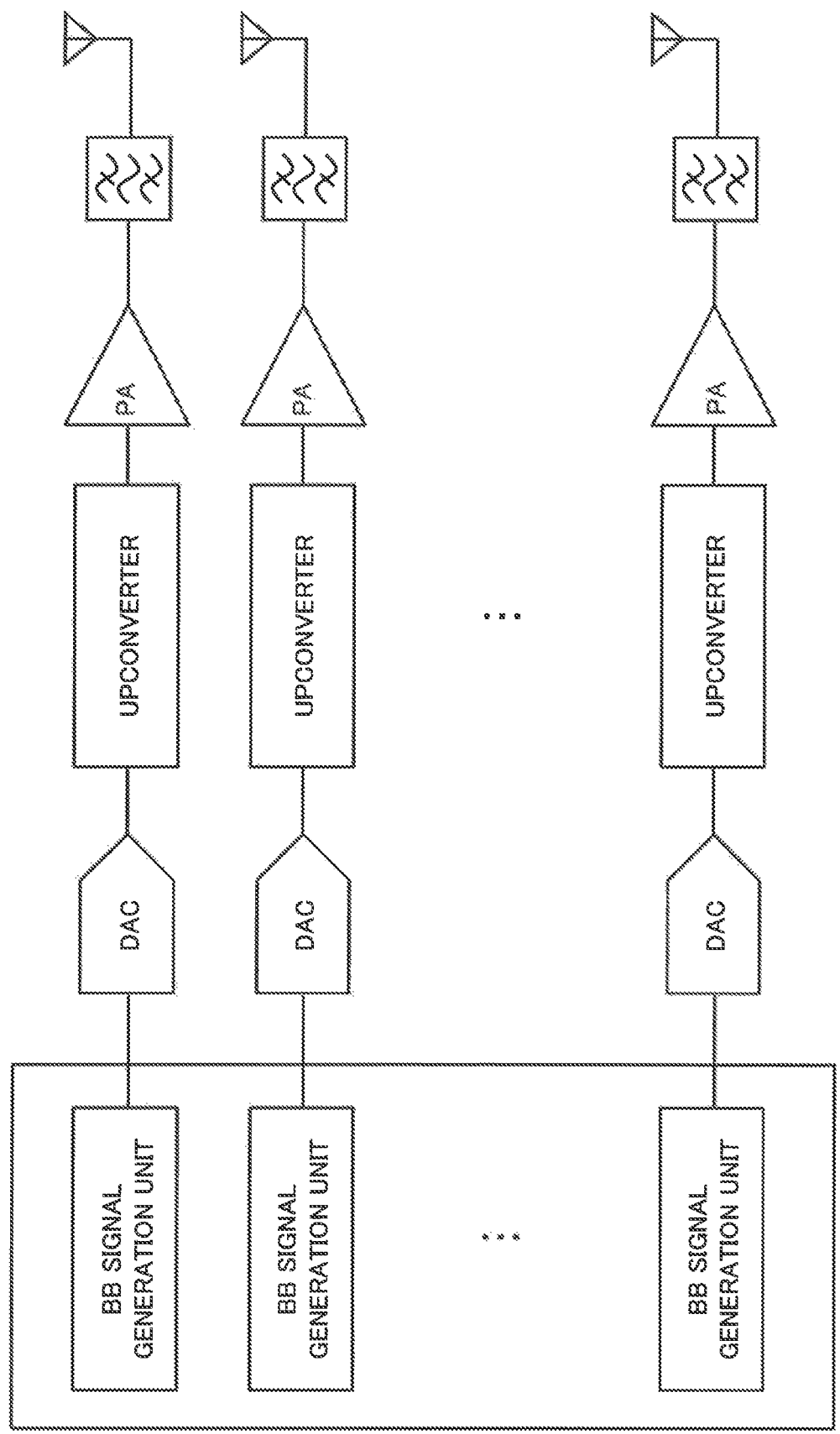
FIG. 11 is a block diagram illustrating a configuration of a transmission device related to the present invention.
Figure 12:
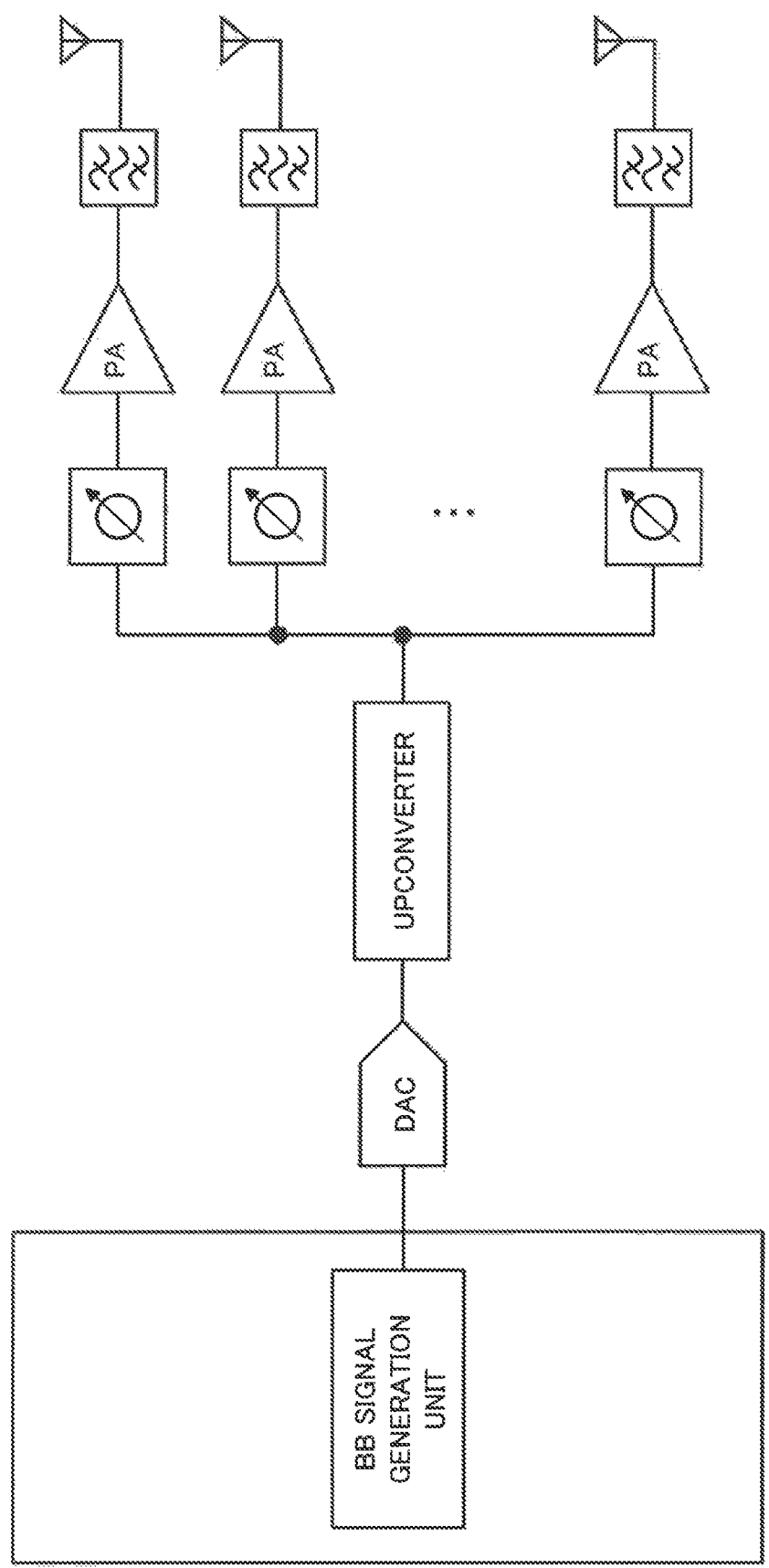
FIG. 12 is a block diagram illustrating a configuration of a transmission device related to the present invention.

The number of logic circuits in the digital delay circuit 21a and the digital delay circuit 21b is set so as to perform synchronization with each other in the antenna 80 in view of synchronization deviation generated due to the antenna wire 81, the synchronization deviation being equal to an integer multiple clock. More specifically, referring to FIG. 10, when the antenna wire 811 is designed to be twice as long as the wavelength corresponding to the clock frequency rather than the antenna wire 812, two-clock delay is generated by the antenna wire 811 as compared with the antenna wire 812. Therefore, the number of logic circuits of the digital delay circuit 212a is set to a number larger by two than the number obtained in the initial setting (setting in the fourth example embodiment) such that the output of the digital delay circuit 212b is delayed by 2 clocks from the output of the digital delay circuit 211b. Thus, in the patch antennas 801, 802, the synchronization therebetween can be obtained.

Like the second example embodiment, the antenna 80 radiates electromagnetic waves to the space based on the bandpass output signal output from the bandpass filter 40.

Figure 7A:
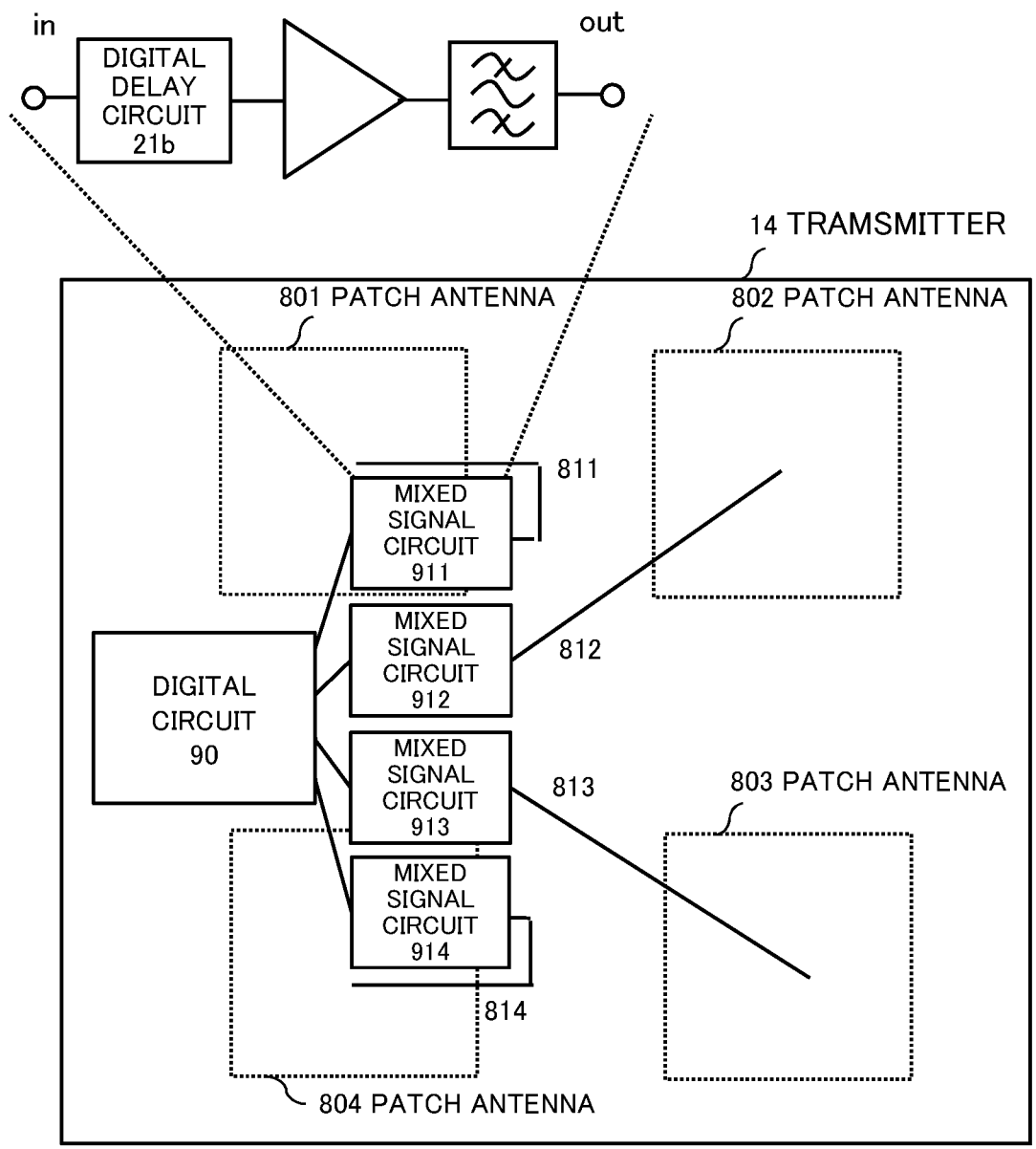
FIG. 7A is a diagram illustrating a specific example of a transmitter 14 according to the fifth example embodiment of the present invention.
Figure 7B:
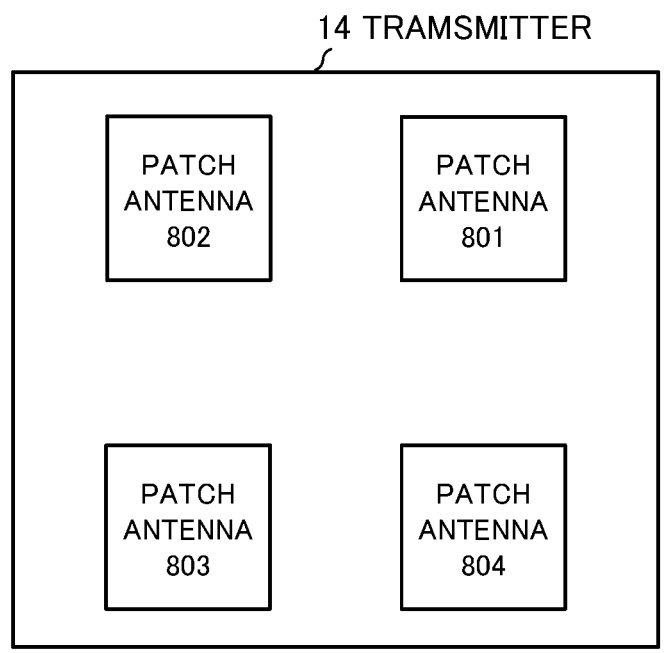
FIG. 7B is a diagram illustrating a specific example of a transmitter 14 according to the fifth example embodiment of the present invention.

FIGS. 7A and 7B illustrate the digital circuit 90, the mixed signal circuit 91, the antenna wire 81, and the antenna 80 implemented on the substrate. The correspondence between FIG. 6 and FIGS. 7A and 7B will be described below.

FIGS. 7A and 7B illustrate the substrate when the number of antennas is set to 4 in FIG. 6 and the antenna 80 is constituted by a patch antenna.

Note that, in this example, the antenna wires 81 are not equal to each other in the length and antenna wires 811, 814 are shorter than the antenna wires 812, 813. In a case where the clock frequency of the clock generation unit 70 is 12 GHz, for example, the wiring length of the antenna wires 811, 814 is a length of 10 cm, and the wiring length of the antenna wires 812, 813 is set to 10 cm+2.5×kcm (2.5 cm is a wavelength of 12 GHz, and k is an integer of 1 or more), and at the output of the digital delay circuit 21b, the output of the digital delay circuits 211b and 214b is delayed by k clocks (relative to the clock frequency of the clock generation unit 70) than the output of the digital delay circuits 212b and 213b, so that the radio signals can be synchronized at the antennas. Although the wavelength of 12 GHz signal in vacuum is 2.5 cm in the above example, since the wavelength of the signal propagating in the antenna differs depending on the material of the antenna, and the like, the wiring length of the antenna wire may be configured to be set in accordance with the material and the like of the antenna wire.

The transmitter 14 according to the fifth example embodiment greatly alleviates the restriction on the length of the radio wave up to the antenna 80 (only difference restriction in the wiring length of the antenna wire), and performs delay adjustment in the mixed signal circuit 91, and therefore, the transmitter 14 according to the fifth example embodiment can synchronize input signals at the input stage of antenna 80. Therefore, the transmitter 14 can substantially improves variations in wiring length at the preceding stage of the mixed signal circuit 91 and reduces degradation of signal quality While the invention has been particularly shown and described with reference to each of example embodiments and examples thereof, the invention is not limited to these embodiments. It will be understood by those of ordinary skill in the art that various changes in form and details may be made therein without departing from the spirit and scope of the present invention as defined by the claims.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-188933, filed on Sep. 28, 2016, the disclosure of which is incorporated herein in its entirety by reference.

REFERENCE SIGNS LIST 10, 11, 12, 13, 14 transmitter
20, 21 digital delay circuit
21a, 21b digital delay circuit
22, 23, . . . , 2m, . . . , 2n logic circuit
30 amplification device
40 bandpass filter
50 BB signal generation unit
60 one-bit modulation device
70 clock generation unit
71 phase adjustment device
80 antenna
801, 802, . . . , 804 patch antenna
81 antenna wire
90 digital circuit
91 mixed signal circuit
911, 912, . . . , 914 mixed signal circuit

What is claimed is:

1. A transmitter comprising:
a digital delay circuit delaying a one-bit digital RF signal based on another one-bit digital RF signal;
an amplifier configured to amplify a signal output from the digital delay circuit;
a bandpass filter passing a signal of a predetermined frequency band out of the signals output from the amplifier; and
a clock generator configured to generate a clock having a frequency which is an integral multiple of a bit rate of the one-bit digital RF signal,
wherein the signal output by the bandpass filter is input to corresponding antenna element of the plurality of antenna elements and controls directivity of a beam formed by the plurality of antenna elements,
the digital delay circuit is constituted by one logic circuit or a plurality of logic circuits connected in series, and
the one or more logic circuits delay the one-bit digital RF signal, based on the clock.

2. The transmitter according to claim 1, wherein the digital delay circuit has a function of shaping a first waveform which is a waveform of the one-bit digital RF signal, and
wherein a number of the one or more logic circuits is set based on the first waveform and a second waveform which is a waveform of the another one-bit digital RF signal so that the signals input to the plurality of antenna elements are synchronized with each other.

3. The transmitter according to claim 1 further comprising:
a phase adjuster configured to adjust a phase of the clock and output the clock to the one or more logic circuits,
wherein the digital delay circuit delays the one-bit digital RF signal based on the clock output by the phase adjuster.

4. The transmitter according to claim 1, wherein some of the one or more logic circuits, the amplifier, and the bandpass filter in the digital delay circuit are integrated on one chip and
the chip is arranged in an immediate vicinity of the corresponding one of the antenna elements.

5. The transmitter according to claim 4, further comprising:
a second system configured similarly to a first system, the first system including the digital delay circuit, the amplifier, and the bandpass filter,
wherein a difference in length of a wire between the chip in the first system and the corresponding one of the antenna elements and the wire between the chip in the second system and the corresponding one of the antenna elements is an integer multiple of a wavelength corresponding to the frequency of the clock,
the number of the one or more logic circuits is set such that the signals input to the plurality of antenna elements are synchronized with each other based on the difference.

6. The transmitter according to claim 1, wherein the one or more logic circuits include at least a latch circuit.

7. The transmitter according to claim 1, wherein the one or more logic circuits include at least a D flip-flop circuit.

8. A method of controlling a transmitter, comprising:
generating a clock having a frequency which is an integral multiple of a bit rate of a one-bit digital RF signal;
delaying the one-bit digital RF signal based on the clock and another one-bit digital RF signal;
amplifying the delayed one-bit digital RF signal;
inputting only a signal of a predetermined frequency band out of amplified signals into a corresponding antenna element of a plurality of antenna elements; and
controlling directivity of a beam formed by the plurality of antenna elements.

* * * * *